United States Patent [19]

Hsu et al.

[11] Patent Number: 5,501,781
[45] Date of Patent: Mar. 26, 1996

[54] ELECTROCHEMICAL CONVERTER HAVING INTERNAL THERMAL INTEGRATION

[75] Inventors: Michael S. Hsu, Lincoln; Ethan D. Hoag, East Boston, both of Mass.

[73] Assignee: Ztek Corporation, Waltham, Mass.

[21] Appl. No.: 287,093

[22] Filed: Aug. 8, 1994

[51] Int. Cl.[6] .............................. C25B 9/00; C25B 11/02; C25B 15/08
[52] U.S. Cl. ..................... 204/269; 204/270; 204/274; 429/16; 429/26; 429/30; 429/34
[58] Field of Search .................................. 204/269, 270, 204/274, 241; 429/16, 26, 30, 34

[56] References Cited

U.S. PATENT DOCUMENTS

| | | | |
|---|---|---|---|
| 3,505,114 | 4/1970 | Rohr | 136/86 |
| 3,607,427 | 9/1971 | White | 136/86 |
| 3,616,334 | 10/1971 | Aker et al. | 204/129 |
| 3,964,930 | 6/1976 | Reiser | 136/86 |
| 4,056,452 | 11/1977 | Campbell | 204/258 |
| 4,085,016 | 4/1978 | Janjua et al. | 204/104 |
| 4,087,976 | 5/1978 | Morrow, Jr. et al. | 60/643 |
| 4,197,362 | 4/1980 | Schmidberger et al. | 429/12 |
| 4,310,605 | 1/1982 | Early et al. | 429/18 |
| 4,482,440 | 11/1984 | Kadija | 204/105 |
| 4,490,445 | 12/1984 | Hsu | 429/32 |
| 4,574,112 | 3/1986 | Breault et al. | 429/26 |
| 4,583,583 | 4/1986 | Wittel | 165/46 |
| 4,629,537 | 12/1986 | Hsu | 204/266 X |
| 4,721,556 | 1/1988 | Hsu | 204/258 |
| 4,853,100 | 8/1989 | Hsu | 204/256 |
| 4,977,041 | 12/1990 | Shiozawa et al. | 429/26 |
| 4,978,589 | 12/1990 | Shiozawa et al. | 429/26 |
| 5,338,622 | 8/1994 | Hsu et al. | 429/26 |
| 5,347,806 | 9/1994 | Nakhamkin | 60/39.161 |

*Primary Examiner*—Donald R. Valentine
*Attorney, Agent, or Firm*—Thomas J. Engellenner; Anthony A. Laurentano; Lahive & Cockfield

[57] ABSTRACT

An electrochemical converter assembly that significantly reduces the size of the dedicated thermal processing heat exchangers associated with the converter. This reduction is achieved by heating the input reactants of the electrochemical converter assembly inside the axial manifolds. This heating configuration thus relies upon an effective heat transfer mechanism located within the manifolds, and particularly within the manifold surfaces. In a preferred embodiment, the heating of the reactants occurs at the entrance region of the planar gap formed between the interconnector plates and the electrolyte plates. This heating is facilitated by the conduction of heat through the highly thermally conductive interconnector plate to an extended heating surface disposed within the manifold. This extended surface conducts heat from the fuel cell interior to the axial manifolds to heat the reactants to the converter operating temperature prior to passage through the entrance region and eventually through the reactant passageways of the plates.

43 Claims, 4 Drawing Sheets

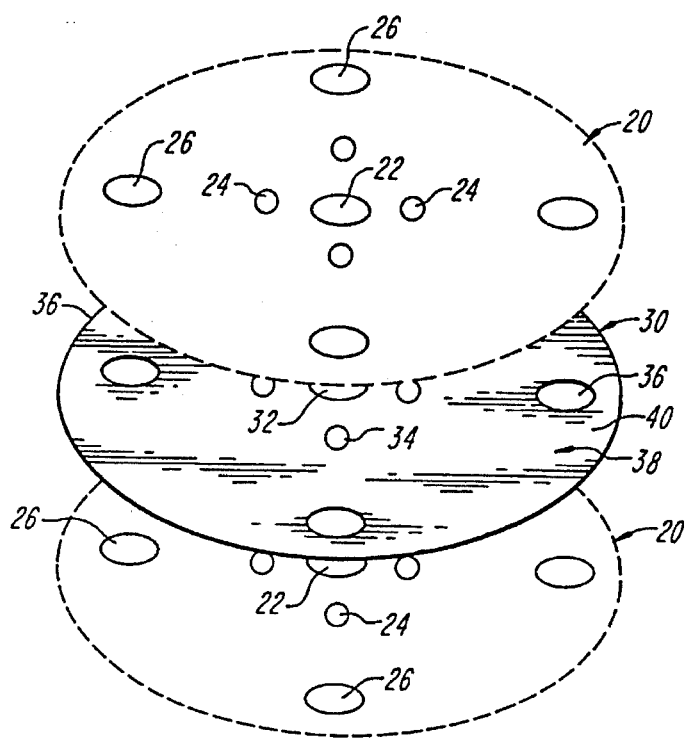
*FIG. 1A*
*FIG. 1B*
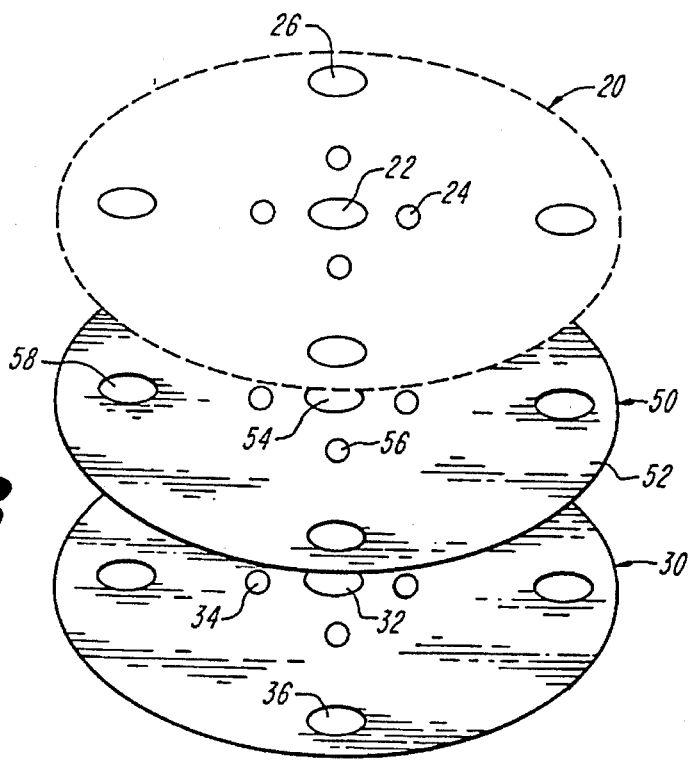

ELECTROCHEMICAL CONVERTER HAVING INTERNAL THERMAL INTEGRATION

RELATED APPLICATIONS

This application is related to the copending application Ser. No. 08/215,466, entitled "Electrochemical Converter Having Optimal Pressure Distribution", filed on 21 Mar. 1994, which is herein incorporated by reference.

BACKGROUND OF THE INVENTION

This invention relates to high temperature electrochemical converters, and specifically to high performance power systems employing such devices and methods.

Conventional, electrochemical converters perform fuel-to-electricity conversions in a fuel cell (electric generator) mode or electricity-to-fuel conversions in an electrolyzer (fuel synthesizer) mode. The converters are capable of high efficiencies, depending only on the relation between the free energy and enthalpy of the electrochemical reaction, and are not limited by Carnot-cycle considerations.

The key components in an electrochemical energy converter are a series of electrolyte units having electrodes disposed over its surfaces, and a similar series of interconnectors disposed between the electrolyte units to provide serial electrical connections. Each electrolyte unit is an ionic conductor having low ionic resistance thereby allowing the transport of an ionic species from one electrode-electrolyte interface to the opposite electrode-electrolyte interface under the operating conditions of the converter. Various electrolytes can be used in such converters. For example, zirconia stabilized with such compounds as magnesia, calcia or yttria can satisfy these requirements when operating at an elevated temperature (typically around 1000° C.). The electrolyte material utilizes oxygen ions to carry electrical current. The electrolyte should not be conductive to electrons which can cause a short-circuit of the converter. On the other hand, the interconnector must be a good electronic conductor. The interaction of the reacting gas, electrode and electrolyte occurs at the electrode-electrolyte interface, which requires that the electrodes be sufficiently porous to admit the reacting gas species and to permit exit of product species.

The "traditional" method for fuel cell thermal management is to force a cooling medium, either a liquid or gaseous coolant stream, through the fuel cell assembly. Cooling water is often employed for ambient temperature devices, and air can be employed for higher temperature fuel cells. In some instances, the same air which serves as the fuel cell's oxidant is used as a cooling medium as well. The cooling medium passes through the fuel cell and carries off the thermal energy by its sensible heat capacity. The volume flow of coolant required for this method is inversely related to the limited temperature operating range of the electrochemical operation of the electrolyte, or in the case of fuel cells with ceramic components, by constraints associated with thermal stress.

The foregoing heat capacity limitations on the amount of temperature rise of the cooling medium result in coolant flow rates through the fuel cell much higher than those required by the electrochemical reaction alone. Since these relatively large flow quantities must be preheated to a temperature near the operating temperature of the fuel cell and circulated therethrough, a dedicated reactant thermal management subsystem is required. Such thermal management subsystems normally include equipment for regenerative heating, pumping and processing of the excessive coolant flow. These additional components add substantially to the overall cost of the system.

For illustration purposes, consider a regenerative heat exchanger of a type suitable for preheating the fuel cell reactants and operating with a 100° C. temperature difference, and a typical heat transfer rate of 500 Btu/hr-ft$^2$ (0.13 W/cm$^2$). Further assuming a 50% cell efficiency with no excess coolant flow, and operating at an ambient pressure, the heat processing or heat transfer surface area of the regenerator would be of the same order of magnitude as the surface area of the fuel cell electrolyte. Considering an excess coolant flow requirement of 10 times the level required for the fuel cell reactant flow, which is normally required to sufficiently cool the fuel cell in conventional approaches, the heat exchanger surface area would be 10 times larger than the active fuel cell surface area. The large size of this heat exchanger makes it difficult to integrate the heat exchanger with electrochemical converters to form a compact and efficient thermal management system or to integrate the electrochemical converter with a dedicated power system.

Conventional high performance power systems exist and are known, and include steam and gas turbines. A conventional gas turbine power system includes a compressor, a combustor, and a gas turbine, typically connected in-line, e.g., connected along the same axis. In a conventional gas turbine, air enters the compressor and exits at a desirable elevated pressure. This high-pressure air stream enters the combustor, where it reacts with fuel, and is heated to a selected elevated temperature. This heated gas stream then enters the gas turbine and expands adiabatically, thereby performing work. One drawback of gas turbines of this general type is that the turbine typically operates at relatively low system efficiencies, usually around 25%.

One prior art method employed to overcome this problem is to directly channel high-temperature exhaust exiting the combustor into a recuperator for recovering heat. This recovered heat is typically used to further heat the air stream prior to the stream entering the combustor. A drawback of this solution is that the recuperator is relatively expensive and thus adds to the overall cost of the power system.

Another prior art method employed is to operate the system at a relatively high pressure and a relatively high temperature to thereby increase system efficiency. However, the actual increase in system efficiency has been nominal, while the system is subjected to the costs associated with maintaining this high pressure and temperature environment.

Thus, there exists a need in the art for better thermal management and integration approaches, especially for use in high performance power systems. In particular, an improved power system that is capable of integrating and employing the desirable properties of electrochemical converters would represent a major improvement in the industry. More particularly, an improved electrochemical converter and gas turbine system that reduces the costs associated with providing dedicated thermal processing control systems would also represent a major improvement in the art. Furthermore, a power system that utilizes an electrochemical converter and that has increased system efficiency would also be desirable.

SUMMARY OF THE INVENTION

The present invention provides for an electrochemical converter assembly and systems that employ the same that significantly reduces the size of the dedicated thermal processing heat exchangers associated with the converter and significantly reduces the corresponding heat exchange area. This reduction is achieved by heating the input reactants of the electrochemical converter assembly inside the axial manifolds. This heating configuration thus relies upon an effective heat transfer mechanism located within the manifolds, and particularly within the manifold surfaces. In a preferred embodiment, the heating of the reactants occurs at the entrance region of the planar gap formed between the interconnector plates and the electrolyte plates. This heating is facilitated by the conduction of heat through the highly thermally conductive interconnector plate to an extended surface disposed within the manifold. This extended surface conducts heat from the fuel cell interior to the axial manifolds to heat the reactants to the converter operating temperature prior to passage through the entrance region and eventually through the reactant passageways of the plates.

The electrochemical converter of the present invention includes a stack of converter plate elements that has a plurality of electrolyte plates and interconnector plates. The electrolyte plates have an oxidizer electrode material on one side and a fuel electrode material on the opposing side, and the interconnector plates provide electrical contact with the electrolyte plates. A plurality of manifolds are axially formed within the stack and are adapted to receive the converter input reactants. The converter further includes an internal reactant heating element that is disposed within the manifolds for heating the reactants to the operating temperature of the converter while passing through the axial manifolds.

According to one aspect of the invention, the interconnector plate has an integrally formed extended surface or lip that protrudes into the plurality of axial manifolds. According to one practice of the invention, the internal reactant heating element comprises the extended surface.

According to another aspect of the invention, the stack of converter plate elements has a plurality of spacer plates interposed between the electrolyte and interconnector plates. The spacer plate has attached thereto an extended heating surface that protrudes into the plurality of axial manifolds. According to another practice of the invention, the internal reactant heating element comprises this extended surface.

According to another aspect of the invention, the interconnector plate comprises a highly thermally conductive connector plate, which conductively transfers waste heat generated by the electrochemical converter to the axial manifolds.

According to further aspects of the invention, the converter further includes a preheating element for preheating the reactants prior to introduction to the converter. In a preferred practice, the preheating element comprises an external regenerative heat exchanger. Furthermore, the preheating element and the internal reactant heating element disassociates the input reactants, which includes hydrocarbon fuels and reforming agents, into non-complex reaction species.

The present invention further encompasses a power generating system that includes an electrochemical converter assembly having a plurality of stacked converter elements, an internal reactant heating element, and a turbine. The converter assembly includes a plurality of electrolyte plates having an oxidizer electrode material on one side and a fuel electrode material on the opposing side, and a plurality of interconnector plates for providing electrical contact with the electrolyte plates, wherein the stack of converter elements is assembled by alternately stacking the interconnector plates with the electrolyte plates. A plurality of manifolds are axially formed within the stack and are adapted to receive the input reactants. The internal reactant heating element is preferably disposed within the manifolds for heating the reactants to the operating temperature of the converter assembly while passing through the manifolds. The turbine is adapted to receive the exhaust and heat output of the electrochemical converter assembly.

According to one aspect, the power generating system further includes a preheating element for preheating the reactants prior to introduction to the electrochemical converter. The preheating element preferably comprises an external regenerative heat exchanger, a radiative heat exchanger, or a compressor, when the turbine is a gas turbine; and the preheating element preferably comprises a heat recovery steam generator when the turbine is a steam turbine.

According to another aspect of the invention, the interconnector plate comprises a highly thermally conductive connector plate, which conductively transfers waste heat generated by the electrochemical converter to the axial manifolds.

According to still another aspect of the invention, the interconnector plate has an integrally formed extended surface that protrudes into the plurality of axial manifolds. According to one preferred practice of the invention, the internal reactant heating element comprises the extended surface.

According to another aspect of the invention, the stack of converter plate elements has a plurality of spacer plates interposed between the electrolyte and interconnector plates. The spacer plate has attached thereto an extended heating surface or lip that protrudes into the plurality of axial manifolds. According to another practice of the invention, the internal reactant heating element comprises this extended surface.

According to further aspects of the invention, the turbine can be either a gas turbine or a steam turbine. According to another practice of the invention, the turbine is a gas turbine comprising a compressor that is coupled to a rotary turbine structure, and the electrochemical converter is placed serially in-line between the compressor and the turbine. According to still another practice of the invention, a converter exhaust heating element is disposed between the converter and the rotary turbine structure for heating the exhaust of the converter assembly to a selected elevated temperature prior to introduction to the turbine.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

FIG. 1A is a perspective view of a basic cell unit of an electrochemical converter of the invention;

FIG. 1B is a perspective view of an alternate embodiment of the basic cell unit of the electrochemical converter of the present invention;

DETAILED DESCRIPTION

Figure 2:
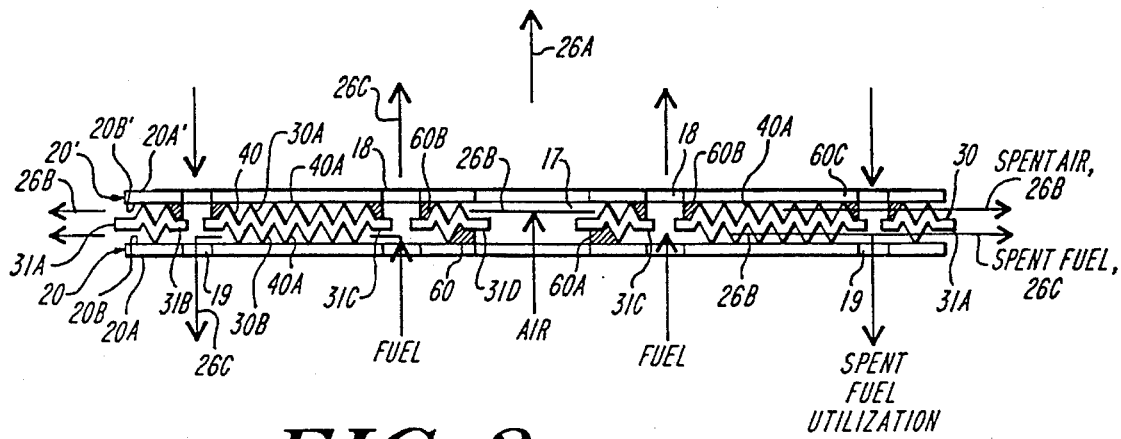
FIG. 2 is a cross-sectional view of the cell unit of FIG. 1A.

FIGS. 1A, 1B, and 2 illustrate the basic cell unit 10 of the electrochemical converter of the present invention. The cell unit 10 includes an electrolyte plate 20 and an interconnector plate 30. In one embodiment, the electrolyte plate 20 can be made of a ceramic, such as a stabilized zirconia material $ZrO_2(Y_2O_3)$, on which a porous oxidizer electrode material 20A and a porous fuel electrode material 20B are disposed thereon. Exemplary materials for the oxidizer electrode material are perovskite materials, such as $LaMnO_3(Sr)$. Exemplary materials for the fuel electrode material are cermets such as $ZrO_2/Ni$ and $ZrO_2/NiO$.

The interconnector plate 30 preferably is made of an electrically and thermally conductive interconnect material. Examples of such material include nickel alloys, platinum alloys, non-metal conductors such as silicon carbide, $La(Mn)CrO_3$, and preferably commercially available Inconel, manufactured by Inco., U.S.A. The interconnector plate 30 serves as the electric connector between adjacent electrolyte plates and as a partition between the fuel and oxidizer reactants. As best shown in FIG. 2, the interconnector plate 30 has a central aperture 32 and a set of intermediate, concentric radially outwardly spaced apertures 34. A third outer set of apertures 36 are disposed along the outer cylindrical portion or periphery of the plate 30.

Figure 3:
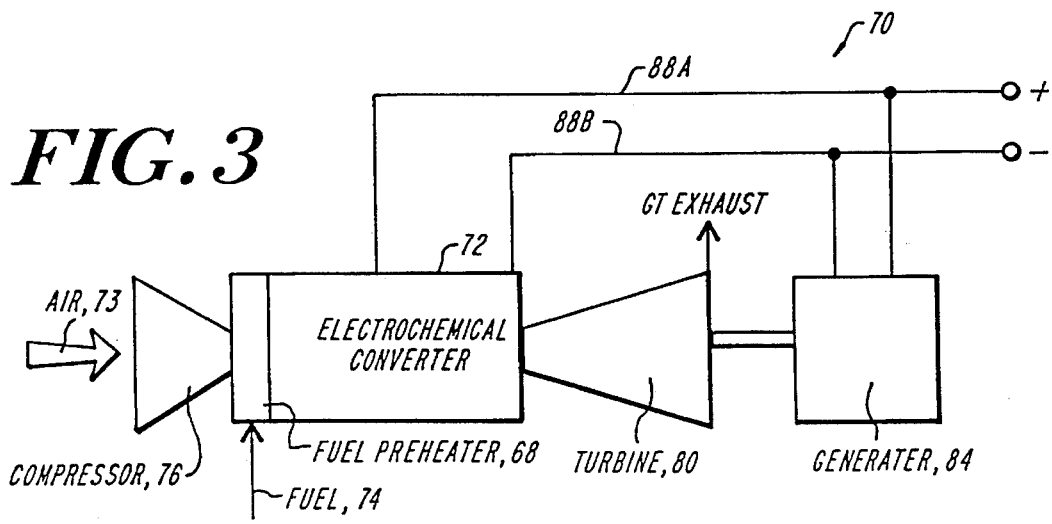
FIG. 3 is a schematic block diagram of a power system employing an electrochemical converter serially in-line with a gas turbine according to the present invention.

The interconnector plate 30 has a textured surface 38. The textured surface preferably has formed thereon a series of dimples 40, as shown in FIG. 3, which form a series of connecting reactant-flow passageways. Preferably, both sides of the interconnector plate 30 have the dimpled surface formed thereon. Although the intermediate and outer set of apertures 34 and 36, respectively, are shown with a selected number of apertures, those of ordinary skill will recognize that any number of apertures or distribution patterns can be employed, depending upon the system and reactant-flow requirements.

Likewise, the electrolyte plate 20 has a central aperture 22, and a set of intermediate and outer apertures 24 and 26 that are formed at locations complementary to the apertures 32, 34 and 36, respectively, of the interconnector plate 30.

Referring to FIG. 1B, a spacer plate 50 can be interposed between the electrolyte plate 20 and the interconnector plate 30. The spacer plate 50 preferably has a corrugated surface 52 that forms a series of connecting reactant-flow passageways, similar to the interconnecting plate 30. The spacer plate 50 also has a number of concentric apertures 54, 56, and 58 that are at locations complementary to the apertures of the interconnect and electrolyte plates, as shown. Further, in this arrangement, the interconnector plate 30 is devoid of reactant-flow passageways. The spacer plate 50 is preferably made of an electrically conductive material, such as nickel.

The illustrated electrolyte plates 20, interconnector plates 30, and spacer plates 50 can have any desirable geometric configuration. Furthermore, the plates having the illustrated manifolds can extend outwardly in repetitive or non-repetitive patterns, and thus are shown in dashed lines.

Referring to FIG. 2, when the electrolyte plates 20 and the interconnector plates 30 are alternately stacked and aligned along their respective apertures, the apertures form axial (with respect to the stack) manifolds that feed the cell unit with the input reactants and that exhaust spent fuel. In particular, the aligned central apertures 22,32,22' form input oxidizer manifold 17, the aligned concentric apertures 24,34,24' form input fuel manifold 18, and the aligned outer apertures 26,36,26' form spent fuel manifold 19.

The dimpled surface 38 of the interconnector plate 30 has, in the cross-sectional view of FIG. 2, a substantially corrugated pattern formed on both sides. This corrugated pattern forms the reactant-flow passageways that channel the input reactants towards the periphery of the interconnector plates. The interconnector plate also has an extended heating surface or lip structure that extends within each axial manifold and about the periphery of the interconnector plate. Specifically, the interconnector plate 30 has a flat annular extended surface 31A formed along its outer peripheral edge. In a preferred embodiment, the illustrated heating surface 31A extends beyond the outer peripheral edge of the electrolyte plate 20. The interconnector plate further has an extended heating surface that extends within the axial manifolds, for example, edge 31B extends into and is housed within the axial manifold 19; edge 31C extends into and is housed within the axial manifold 18; and edge 31D extends into and is housed within the axial manifold 17. The extended heating surfaces can be integrally formed with the interconnector plate or can be coupled or attached thereto. The heating surface need not be made of the same material as the interconnector plate, but can comprise any suitable thermally conductive material that is capable of withstanding the operating temperature of the electrochemical converter. In an alternate embodiment, the extended heating surface can be integrally formed with or coupled to the spacer plate.

The absence of a ridge or other raised structure at the interconnector plate periphery provides for exhaust ports that communicate with the external environment. The reactant-flow passageways connect, fluidwise, the input reactant manifolds with the outer periphery, thus allowing the reactants to be exhausted to the external environment, or to a thermal container or pressure vessel disposed about the electrochemical converter, FIG. 7.

Referring again to FIG. 2, the illustrated sealer material 60 can be applied to portions of the interconnector plate 30 at the manifold junctions, thus allowing selectively a particular input reactant to flow across the interconnector surface and across the mating surface of the electrolyte plate 20. The interconnector plate bottom 30B contacts the fuel electrode coating 20B of the electrolyte plate 20. In this arrangement, it is desirable that the sealer material only allow fuel reactant to enter the reactant-flow passageway, and thus contact the fuel electrode.

As illustrated, the sealer material 60A is disposed about the input oxidizer manifold 17, forming an effective reactant flow barrier about the oxidizer manifold 17. The sealer material helps maintain the integrity of the fuel reactant contacting the fuel electrode side 20B of the electrolyte plate 20, as well as maintain the integrity of the spent fuel exhausted through the spent fuel manifold 19.

The top 30A of the interconnector plate 30 has the sealer material 60B disposed about the fuel input manifolds 18 and the spent fuel manifold 19. The top of the interconnector plate 30A contacts the oxidizer coating 20B' of an opposing electrolyte plate 20'. Consequently, the junction at the input oxidizer manifold 17 is devoid of sealer material, thereby allowing the oxidizer reactant to enter the reactant-flow passageways. The sealer material 60B that completely surrounds the fuel manifolds 18 inhibits the excessive leakage of the fuel reactant into the reactant-flow passageways, thus inhibiting the mixture of the fuel and oxidizer reactants. Similarly, the sealer material 60C that completely surrounds the spent fuel manifold 19 inhibits the flow of spent oxidizer reactant into the spent fuel manifold 19. Hence, the purity of the spent fuel that is pumped through the manifold 19 is maintained.

Referring again to FIG. 2, the oxidizer reactant can be introduced to the electrochemical converter through axial manifold 17 that is formed by the apertures 22, 32, and 22' of the electrolyte and interconnector plates, respectively. The oxidizer is distributed over the top of the interconnector plate 30A, and over the oxidizer electrode surface 20A' by the reactant-flow passageways. The spent oxidizer then flows radially outward toward the peripheral edge 31A, and is finally discharged along the converter element periphery. The sealer material 60C inhibits the flow of oxidizer into the spent fuel manifold 19. The flow path of the oxidizer through the axial manifolds is depicted by solid black arrows 26A, and through the oxidizer cell unit by the solid black arrows 26B.

The fuel reactant is introduced to the electrochemical converter 10 by way of fuel manifold 18 formed by the aligned apertures 24, 34, and 24' of the plates. The fuel is introduced to the reactant-flow passageways and is distributed over the bottom of the interconnector plate 30B, and over the fuel electrode coating 20B of the electrolyte plate 20. Concomitantly, the sealer material 60A, prevents the input oxidizer reactant from entering the reactant-flow passageways and thus mixing with the pure fuel/spent fuel reactant mixture. The absence of any sealer material at the spent fuel manifold 19 allows spent fuel to enter the manifold 19. The fuel is subsequently discharged along the annular edge 31A of the interconnector plate 30. The flow path of the fuel reactant is illustrated by the solid black arrows 26C.

The dimples 40 of the interconnector surface have an apex 40A that contact the electrolyte plates, in assembly, to establish an electrical connection therebetween.

A wide variety of conductive materials can be used for the thin electroconnector plates of this invention. Such materials should meet the following requirements: (1) high strength, as well as electrical and thermal conductivity; (2) good oxidation resistance up to the working temperature; (3) chemical compatibility and stability with the input reactants; and (4) manufacturing economy when formed into the textured plate configuration exemplified by reactant-flow passageways.

The suitable materials for interconnector fabrication include nickel alloys, nickel-chromium alloys, nickel-chromium-iron alloys, iron-chromium-aluminum alloys, platinum alloys, cermets of such alloys and refractory material such as zirconia or alumina, silicon carbide and molybdenum disilicide.

The textured patterns of the top and bottom of the interconnector plate can be obtained, for example, by stamping the metallic alloy sheets with one or more sets of matched male and female dies. The dies are preferably prefabricated according to the desired configuration of the interconnector plate, and can be hardened by heat treatment to withstand the repetitive compressing actions and mass productions, as well as the high operating temperatures. The stamp forming process for the interconnectors is preferably conducted in multiple steps due to the geometrical complexity of the gas passage networks, e.g., the dimpled interconnector plate surface. The manifolds formed in the interconnector plates are preferably punched out at the final step. Temperature annealing is recommended between the consecutive steps to prevent the overstressing of sheet material. The stamping method is capable of producing articles of varied and complex geometry while maintaining uniform material thickness.

Alternatively, corrugated interconnectors can be formed by electrodeposition on an initially flat metal plate using a set of suitable masks. Silicon carbide interconnector plates can be formed by vapor deposition onto pre-shaped substrates, by sintering of bonded powders, or by self-bonding processes.

The oxidizer and fuel reactants are preferably preheated to a suitable temperature prior to entering the electrochemical converter. This preheating can be performed by any suitable heating structure, such as a regenerative heat exchanger or a radiative heat exchanger, for heating the reactants to a temperature sufficient to reduce the amount of thermal stress applied to the converter.

Additionally, a significant feature of the present invention is that the extended heating surfaces 31D and 31C heat the reactants contained within the oxidizer and fuel manifolds 17 and 18 to the operating temperature of the converter. Specifically, the extended surface 31D that protrudes into the oxidizer manifold 17 heats the oxidizer reactant, and the extended surface 31C that protrudes into the fuel manifold 18 heats the fuel reactant. The highly thermally conductive interconnector plate 30 facilitates heating of the input reactants by conductively transferring heat from the fuel cell internal surface, e.g., the middle region of the conductive interconnector plate, to the extended surfaces or lip portions, thus heating the input reactants to the operating temperature prior to traveling through reactant flow passageways. The extended surfaces thus function as a heat fin. This reactant heating structure provides a compact converter that is capable of being integrated with an electricity generating power system, and further provides a highly efficient system that is relatively low in cost.

The operating temperature of the electrochemical converter is preferably between about 20° C. and 1500° C., and the preferred fuel cell types employed by the present invention are solid oxide fuel cells, molten carbonate fuel cells, alkaline fuel cells, phosphoric acid fuel cells, and proton membrane fuel cells.

The illustrated fuel cell assembly can be employed in a power generating system, as shown in FIGS. 3–6. Referring to FIG. 3, the illustrated in-line, aero-derivative power system 70 includes an electrochemical converter 72 and a gas turbine. The gas turbine comprises a compressor 76, a turbine 80, and a generator 84. Air from air source 73 is introduced to the compressor 76 by way of any suitable conduit where it is compressed, and thus heated, and then discharged and introduced to the electrochemical converter 72. The fuel 74 passes through a preheater 68 where they are preheated to a selected elevated temperature below the converter operating temperature, and are introduced to the electrochemical converter to power the converter. The primary heating of the reactants occurs at the thermally conductive extended heating surfaces of the interconnector plates that extend into the axial manifolds.

The converter 72 heats the compressed air introduced by the compressor 76 with the fuel 74 and introduces the exhaust to the gas turbine 80, which converts the thermal energy into rotary energy, for subsequent transfer to an electric generator 84. The generator 84 produces electricity that can be used for both commercial and residential purposes. The electrical connections 88A and 88B illustrate that electricity can be extracted from both the generator 84 and the converter 72.

Figure 4:
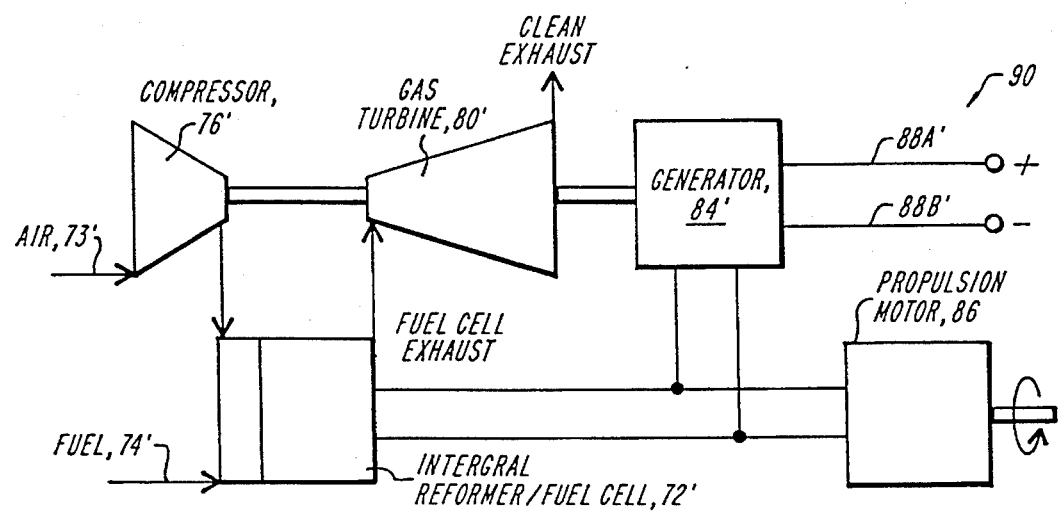
FIG. 4 is a schematic block diagram of an alternate embodiment of a power system employing an electrochemical converter out of line with a gas turbine according to the present invention.

FIG. 4 illustrates a power system 90 where the electrochemical converter 72' is coupled off-line from the gas turbine. Air from the air source 73' is compressed by the compressor 76', discharged, and then introduced to the off-line converter 72'. Fuel from a fuel source 74' is introduced to the converter and the air and fuel are consumed thereby. The converter thermally disassociates the fuel into constituent non-complex simple reaction species, typically $H_2$ and CO, and creates exhaust, which is introduced to the gas turbine 80', which is coupled to the electric generator 84'. The illustrated generator 84' and converter 72' can be used to power a propulsion motor 86. The system 90 can further employ a preheater, similar to the preheater of FIG. 3, to preheat the reactants prior to introduction to the converter 72.

Figure 5:
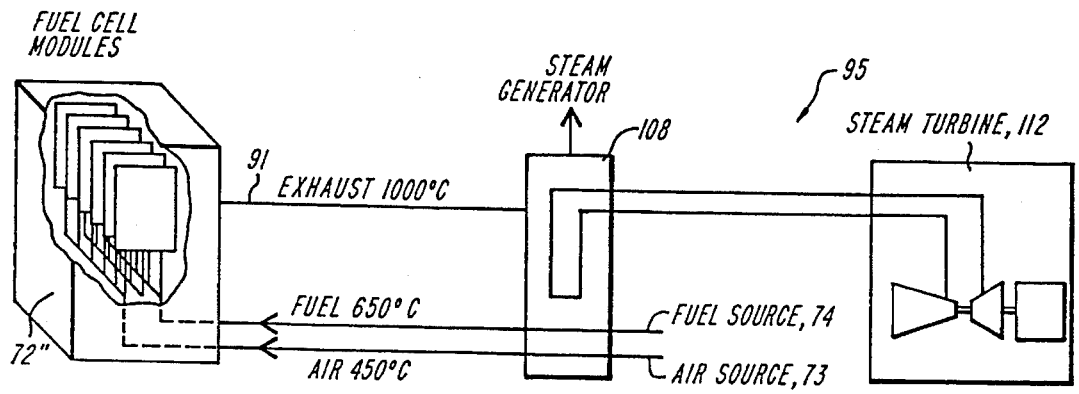
FIG. 5 is a schematic block diagram of a power system employing an electrochemical converter and a steam turbine according to the present invention.

FIG. 5 illustrates a power system 95 that employs an electrochemical converter 72", a heat recovery steam generator 108 (HRSG), and a steam turbine 112, connected as shown. The steam generator 108 functions as a preheater by preheating the input reactants, e.g., air and fuel, to a desirable elevated temperature below the operating temperature of the converter 72'. The converter utilizes the input reactants, which are heated to the converter operating temperature by the extended heating surfaces, and creates waste heat and heated exhaust 91. The exhaust 91 can be conveyed to the steam generator 108 by any suitable means, such as by a conduit. The heated exhaust helps preheat the reactants 73,74 by a regenerative heat exchange process, while concomitantly heating working medium associated with the steam turbine, such as water, to produce steam for the steam turbine 112. Additionally, the internal portions of the steam generator 108 includes means for reforming fuel by thermally disassociating fuel, which typically includes hydrocarbons and reforming agents, into non-complex reaction species.

Figure 6:
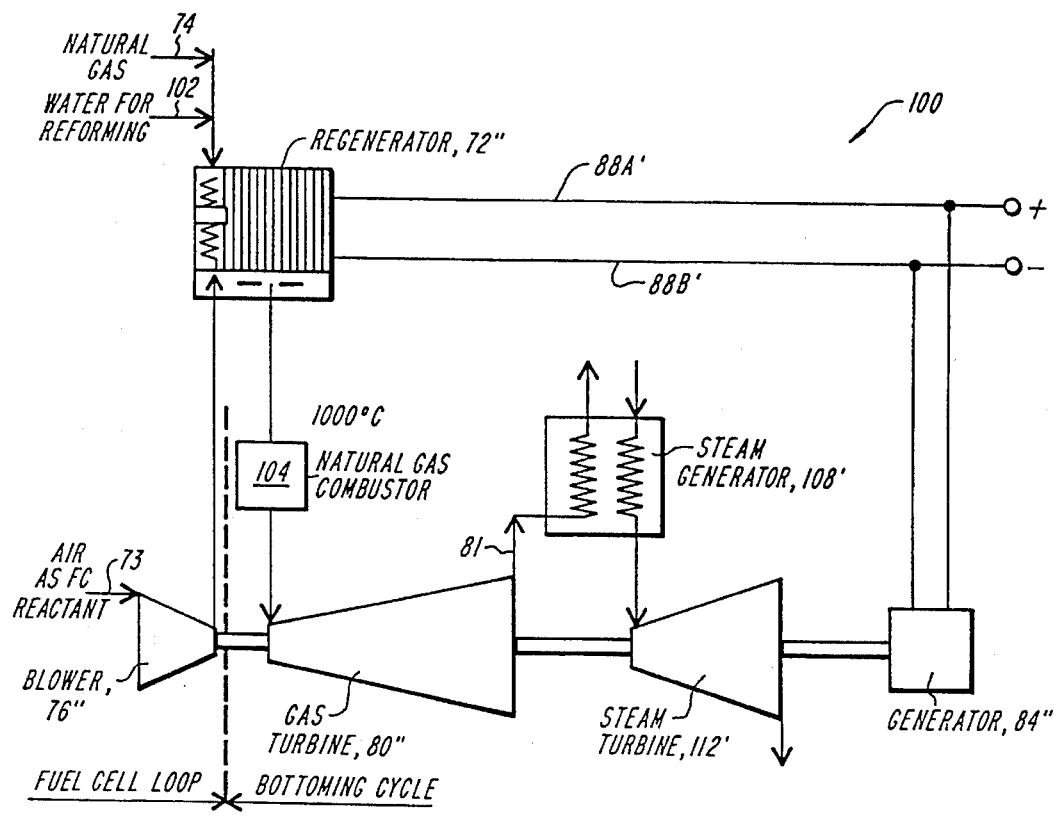
FIG. 6 is a schematic block diagram of another embodiment of a power system employing both a gas turbine, a steam turbine, and a converter exhaust heating element according to the present invention.

FIG. 6 shows an alternate power system 100 that utilizes the electrochemical converter of the present invention. The power system 100 includes, in addition to the above-described system components, a secondary combustor 104, a steam generator 108, and a steam turbine 112'. Fuel from a fuel source 74 and water 102 for reforming, generally supplied by a fluid reservoir (not shown), are introduced to the electrochemical converter 72". The water 102 and the heat produced by the converter 72" help reform the input fuel, e.g., fossil fuel, into usable non-complex reaction species, e.g., molecular hydrogen and carbon monoxide. Air from the air source 73 is introduced to the converter 72" by way of the compressor or blower 76" and combines with the input fuel to power the converter 72". The converter 72" produces a high temperature exhaust, typically around 1000° C., which is further heated to a selected elevated temperature, e.g., 1300° C., by the secondary combustor 104 to match the predetermined inlet temperature requirements of the gas turbine 80". The gas turbine produces an exhaust output 81 which is passed through a heat recovery steam generator 108 for subsequent use with the bottoming steam turbine 112. The steam turbine output is coupled to the electric generator 84". Electrical connections 88A' and 88B' indicate that electricity can be directly extracted from both the electrochemical converter 72" and the generator 84". The illustrated power system 100 provides an advantage in that it allows electricity to be produced in a high efficiency system environment by the direct integration of a high efficiency, compact electrochemical converter with the bottoming plant constituent components.

Figure 7:
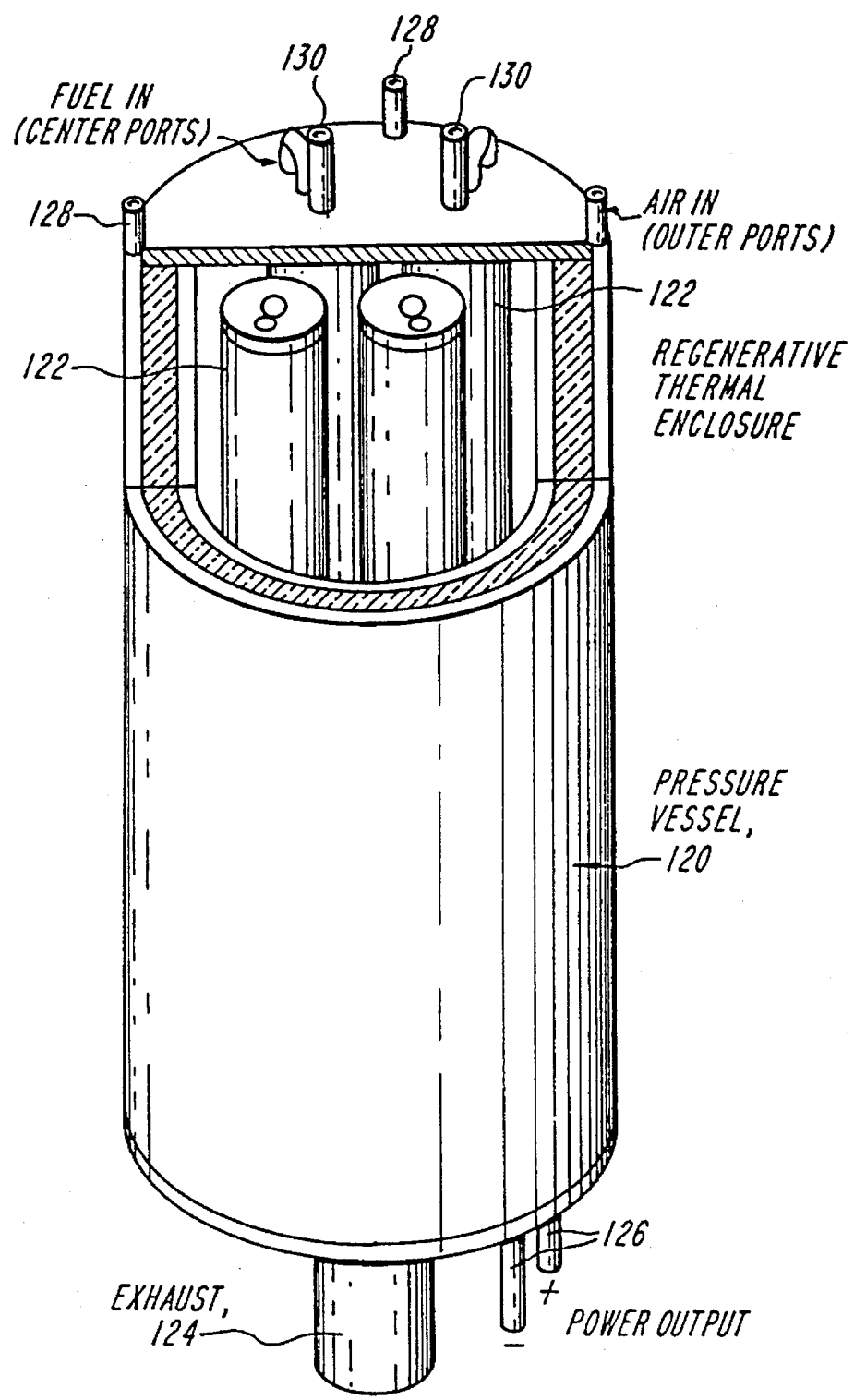
FIG. 7 is a plan view, partially cut-away, of a pressure vessel enclosing a series of electrochemical converters of the present invention.

The direct integration of an electrochemical converter with a gas turbine is aided when the converter is housed within a high pressure vessel. A preferred type of converter encasement is illustrated in FIG. 7, where a pressure vessel 120, which also functions as a regenerative thermal enclosure, encases a series of stacked fuel cell assemblies 122. The basic cell units of the fuel cell assemblies are shown in FIGS. 1A, 1B and 2, and have been previously described. The pressure vessel 120 includes an exhaust outlet manifold 124, electrical connectors 126 and input reactant manifolds 128 and 130. In a preferred embodiment, the oxidizer reactant is introduced to the resident fuel cell assemblies through the centrally located manifolds 130, and the fuel reactant is introduced through the fuel manifolds 128 located about the periphery of the vessel 120.

Fuel cells typically disassociate fuel by utilizing the chemical potential of selected fuel species, such as hydrogen or carbon monoxide molecules, to produce oxidized molecules in addition to electrical power. Since the cost of supplying molecular hydrogen or carbon monoxide is relatively higher than providing traditional fossil fuels, a fuel processing or reforming step can be utilized to convert the fossil fuels, such as coal and natural gas, to a reactant gas mixture high in hydrogen and carbon monoxide. Consequently, a fuel processor, either dedicated or disposed internally within the fuel cell, is employed to reform, by the use of steam, oxygen, or carbon dioxide (in an endothermic reaction), the fossil fuels into non-complex reactant gases.

It will thus be seen that the invention contains improvements over the prior art. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween. For example, the electrochemical converter employing the interconnector plate edge extensions of the present invention can also employ molten carbonate, phosphoric acid, alkaline and proton exchange membrane electrochemical converters and other like converters.

What is claimed is:

1. An electrochemical converter assembly, comprising
   a stack of converter plate elements including
   a plurality of electrolyte plates having an oxidizer electrode material on one side and a fuel electrode material on the opposing side;
   a plurality of interconnector plates for providing electrical contact with said electrolyte plates, wherein said stack of converter elements is assembled by alternately stacking interconnector plates with said electrolyte plates; and a plurality of manifolds axially formed within said stack and adapted to receive reactants, said converter assembly operating at a selected operating temperature; and internal reactant heating means disposed within said manifolds for heating at least a portion of one of said reactants to said operating temperature of said converter assembly while passing through said manifolds.

2. The electrochemical converter assembly of claim 1 wherein said interconnector plate comprises a high thermal conductivity connector plate.

3. The electrochemical converter assembly of claim 1 wherein said internal reactant heating means comprises a thermally conductive and integrally formed extended surface of said interconnector plate that protrudes into said plurality of axial manifolds.

4. The electrochemical converter assembly of claim 1 wherein said converter assembly generates waste heat which heats said reactants to said operating temperature, said waste heat being conductively transferred to said reactants by said interconnector plate and said extended surface.

5. The electrochemical converter of claim 1 wherein said stack of converter plate elements further comprises a plurality of spacer plates interposed between said electrolyte plates and said interconnector plates.

6. The electrochemical converter assembly of claim 5 wherein said internal reactant heating means comprises a thermally conductive and integrally formed extended surface of said spacer plate that protrudes into said plurality of axial manifolds.

7. The electrochemical converter assembly of claim 1 wherein said operating temperature of said converter assembly is between about 20° C. and about 1500° C.

8. The electrochemical converter assembly of claim 1 wherein said stack of converter plate elements constitute a fuel cell selected from the group consisting of a solid oxide fuel cell, molten carbonate fuel cell, phosphoric acid fuel cell, alkaline fuel cell and proton exchange membrane fuel cell.

9. The electrochemical converter assembly of claim 1 further comprising preheating means for preheating said reactants prior to introduction to said converter assembly.

10. The electrochemical converter assembly of claim 9 wherein said preheating means comprises an external regenerative heat exchanger which preheats said reactants by waste heat generated by said converter.

11. The electrochemical converter assembly of claim 9 wherein said preheating means comprises a radiative heat exchanger which preheats said reactants by waste heat generated by said converter.

12. The electrochemical converter assembly of claim 9 wherein at least one of said pre-heating means and said internal reactant heating means disassociates said input reactants, which includes hydrocarbon fuels and reforming agents, into non-complex reaction species.

13. A power generating system comprising an electrochemical converter assembly having a plurality of stacked converter elements which include
a plurality of electrolyte plates having an oxidizer electrode material on one side and a fuel electrode material on the opposing side;
a plurality of interconnector plates for providing electrical contact with said electrolyte plates, wherein said stack of converter elements is assembled by alternately stacking interconnector plates with said electrolyte plates;
a plurality of manifolds axially formed within said stack and adapted to receive reactants, said converter assembly operating at a selected operating temperature; and
internal reactant heating means disposed within said manifolds for heating at least a portion of one of said reactants to said operating temperature of said converter assembly while passing through said manifolds; and
a steam turbine associated with said electrochemical converter.

14. The power generating system of claim 13 wherein said interconnector plate comprises a thermally conductive connector plate.

15. The power generating system of claim 13 wherein said internal reactant heating means comprises a thermally conductive and integrally formed extended surface of said interconnector plate that protrudes into said plurality of axial manifolds.

16. The power generating system of claim 13 wherein said electrochemical converter assembly generates waste heat which heats said reactants to said operating temperature, said waste heat being conductively transferred to said reactants by said interconnector plate and said extended surface.

17. The power generating system of claim 13 wherein said stack of converter elements further comprises a plurality of spacer plates interposed between said electrolyte plates and said interconnector plates.

18. The power generating system of claim 17 wherein said internal reactant heating means comprises a thermally conductive and integrally formed extended surface of said spacer plate that protrudes into said plurality of axial manifolds.

19. The power generating system of claim 13 wherein said operating temperature of said electrochemical converter assembly is between about 20° C. and about 1500° C.

20. The power generating system of claim 13 wherein said electrochemical converter is a fuel cell selected from the group consisting of a solid oxide fuel cell, molten carbonate fuel cell, phosphoric acid fuel cell, alkaline fuel cell, and proton exchange membrane fuel cell.

21. The power generating system of claim 13 further comprising preheating means for preheating said reactants prior to introduction to said electrochemical converter.

22. The power generating system of claim 21 wherein said preheating means comprises an external regenerative heat exchanger which preheats said reactants by waste heat generated by said converter.

23. The power generating system of claim 21 wherein said preheating means comprises a radiative heat exchanger.

24. The power generating system of claim 21 wherein said electrochemical converter assembly generates exhaust having a selected elevated temperature, and said assembly further comprises conduit means for transferring said exhaust to said preheating means to preheat said reactants.

25. The power generating system of claim 21 wherein at least said preheating means and said internal reactant heating means disassociates said input reactants, which includes hydrocarbons and reforming agents, into non-complex reaction species.

26. A power generating system comprising an electrochemical converter assembly having a plurality of stacked converter elements which include
a plurality of electrolyte plates having an oxidizer electrode material on one side and a fuel electrode material on the opposing side;
a plurality of interconnector plates for providing electrical contact with said electrolyte plates, wherein said stack of converter elements is assembled by alternately stacking interconnector plates with said electrolyte plates;

a plurality of manifolds axially formed within said stack and adapted to receive reactants, said converter assembly operating at a selected operating temperature; and internal reactant heating means disposed within said manifolds for heating at least a portion of one of said reactants to said operating temperature of said converter assembly while passing through said manifolds; and a gas turbine associated with said electrochemical converter.

27. The power generating system of claim 26 wherein said interconnector plate comprises a thermally conductive connector plate.

28. The power generating system of claim 26 wherein said internal reactant heating means comprises a thermally conductive and integrally formed extended surface of said interconnector plate that protrudes into said plurality of axial manifolds.

29. The power generating system of claim 26 wherein said stack of converter elements further comprises a plurality of spacer plates interposed between said electrolyte plates and said interconnector plates.

30. The power generating system of claim 29 wherein said internal reactant heating means comprises a thermally conductive and integrally formed extended surface of said spacer plate that protrudes into said plurality of axial manifolds.

31. The power generating system of claim 26 wherein said electrochemical converter assembly generates waste heat which heats said reactants to said operating temperature, said waste heat being conductively transferred to said reactants by said interconnector plate and said extended surface.

32. The power generating system of claim 26 wherein said operating temperature of said electrochemical converter assembly is between about 20° C. and about 1500° C.

33. The power generating system of claim 26 wherein said electrochemical converter is a fuel cell selected from the group consisting of a solid oxide fuel cell, molten carbonate fuel cell, phosphoric acid fuel cell, alkaline fuel cell, and proton exchange membrane fuel cell.

34. The power generating system of claim 26 further comprising preheating means for preheating said reactants prior to introduction to said electrochemical converter.

35. The power generating system of claim 34 wherein said preheating means comprises one of said an external regenerative heat exchanger and a radiative heat exchanger.

36. The power generating system of claim 34 wherein at least said preheating means and said internal reactant heating means disassociates said input reactants, which includes hydrocarbons and reforming agents, into non-complex reaction species.

37. The power generating system of claim 26 wherein said gas turbine comprises a compressor coupled to a rotary turbine structure.

38. The power generating system of claim 37 wherein said electrochemical converter assembly is placed serially in-line between said compressor and said rotary turbine structure.

39. The power generating system of claim 37 wherein said compressor is adapted to preheat at least one of said reactants.

40. The power generating system of claim 37 wherein said electrochemical converter assembly produces exhaust, said system further comprising converter exhaust heating means, disposed between said converter and said rotary turbine structure, for heating said exhaust of said converter assembly to a selected elevated temperature prior to introduction to said turbine structure.

41. The power generating system of claim 40 wherein said converter exhaust heating means comprises a natural gas combustor.

42. The power generating system of claim 26 further comprising regenerative thermal enclosure means forming a pressure vessel about said electrochemical converter assembly.

43. A power generating system comprising an electrochemical converter assembly having a plurality of stacked converter elements which include a plurality of electrolyte plates having an oxidizer electrode material on one side and a fuel electrode material on the opposing side;

a plurality of interconnector plates for providing electrical contact with said electrolyte plates, wherein said stack of converter elements is assembled by alternately stacking interconnector plates with said electrolyte plates;

a plurality of manifolds axially formed within said stack and adapted to receive reactants, said converter assembly operating at a selected operating temperature; and a gas turbine having a compressor and being associated with said electrochemical converter, said compressor being adapted to preheat at least one of said reactants.

* * * * *